United States Patent [19]

Lee, II

[11] Patent Number: 5,511,585
[45] Date of Patent: Apr. 30, 1996

[54] METHOD AND DEVICE FOR PROVIDING FLUID RESISTANCE WITHIN A FLOW PASSAGEWAY

[75] Inventor: Leighton Lee, II, Guilford, Conn.

[73] Assignee: The Lee Company, Westbrook, Conn.

[21] Appl. No.: 222,604

[22] Filed: Mar. 31, 1994

[51] Int. Cl.⁶ ........................................ F15D 1/02
[52] U.S. Cl. ..................... 138/44; 138/41; 138/45
[58] Field of Search .................... 138/41, 44, 40, 138/42, 45; 239/533.1, 533.13, 533.14

[56] References Cited

U.S. PATENT DOCUMENTS

| | | | |
|---|---|---|---|
| 1,883,720 | 10/1932 | Grimes | 138/41 |
| 2,288,715 | 7/1942 | Karrer et al. | 138/44 X |
| 3,109,459 | 11/1963 | Lee, II et al. | 138/41 X |
| 3,537,543 | 11/1970 | Gilbel | 138/44 X |
| 3,702,144 | 11/1972 | Loveland | 138/44 |
| 3,724,502 | 4/1973 | Hayner et al. | 138/41 |
| 4,171,209 | 10/1979 | Brown | 138/41 X |
| 4,874,017 | 10/1989 | Hendrickson | 138/41 X |
| 5,123,452 | 6/1992 | LeBlanc | 138/41 X |
| 5,209,265 | 5/1993 | Taguri et al. | 138/44 X |

Primary Examiner—David Scherbel
Assistant Examiner—Patrick F. Brinson
Attorney, Agent, or Firm—Philip J. Lee

[57] ABSTRACT

A method for providing resistance to flow through a flow passageway comprises partially blocking flow through an orifice of reduced diameter by masking the orifice with an element formed of porous material retained immediately adjacent to every side of the orifice that is expected to be exposed to higher pressure fluid with a greater surface area of the porous masking element being exposed to fluid in the passageway on the higher pressure side of the orifice than is exposed by the orifice to the lower pressure fluid. The orifice may be formed by direct configuration of the passageway walls or by a body adapted to retain the masking element in the body, the outside of the body being adapted to for secure installation within the flow passageway. Resistors in accordance with the present method may have masking elements on one side for use with one directional pressure differentials or masking elements on both sides for use in applications in which bidirectional pressure differentials are anticipated.

28 Claims, 3 Drawing Sheets

METHOD AND DEVICE FOR PROVIDING FLUID RESISTANCE WITHIN A FLOW PASSAGEWAY

BACKGROUND OF THE INVENTION

A. Field of Invention

The present invention relates generally to methods and devices for providing resistance to flow of fluid through a flow passageway and more particularly to a method for achieving high levels of fluid resistance at a low cost and to devices for practicing said method.

B. Description of Related Art

In hydraulic and in fluidics systems generally, it is frequently desirable to provide a means for producing a high level of resistance to flow through a passageway. Commonly used methods for providing resistance to the flow of a fluid, in their simplest form, frequently achieve desired levels of resistance to flow by simply reducing the internal diameter of an orifice through which the fluid must pass. While this method is simple, it is limited by the fact that it has been found to be difficult to produce an orifice smaller than 0.005 inches in diameter in an economical manner. Conventional, relatively low cost methods of molding and machining are currently notable to form orifices smaller than 0.005 inches in diameter. For this reason, methods of achieving high levels of restriction to flow using porous metals formed by sintering powdered metals have been tried. Such methods comprise a step of simply pressing a cylinder or plug of porous, sintered material into a passageway so as to partially block the flow passage, with enough compressive force on the plug to frictionally retain the plug of the porous, sintered material within the flow passage walls so that flow proceeds axially through the sintered material. With such methods the amount of resistance that is provided is dependent upon the number and size of the pores or open spaces in the densest cross section of the material, and to some extent, on the length of the resistor and the smallness of the interstitial spaces. To some extent, the convolutions of the expected flow paths through the material may contribute to providing some resistance to flow, but reducing the cross sectional area of the flow passage, which occurs at the section of maximum density results in the majority of resistance in most cases. With the use of materials of uniform porosity, the effective resistance is expected to occur at whichever end surface is exposed to higher pressure. The amount of resistance achieved by such methods is limited by the size of the flow passage and any strength requirements imposed by the particular application, as well as the density of the material used. The retentive force that can be achieved by the interference of the plug within the passageway is limited by the need to avoid compacting the material by imposing enough force on the sintered material to alter the characteristics of the material, for example, by increasing the density of the material and reducing the interstitial space within the material, thereby reducing the porosity of the material and changing the resistance. In addition, a plug of sintered metal used as a fluid resistor will act as a fine pore filter, a characteristic that may be desirable in some circumstances but which causes the simple plug method to be susceptible to failure by the clogging of the pores. As the sintered material becomes clogged, the resistance presented by the plug changes and may exceed the tolerances of the system. In such methods, both the filtering and resistance functions are performed by the transverse surface at the upstream end because the cross-section presenting the least open area is normally the upstream, transverse end surface. Therefore, the porosity of the upstream end surface effectively determines the resistance achieved, and the rate of clogging of the resistor depends upon the number and size of the pores in the upstream, transverse end surface. For this reason, the resistance achieved by such methods is expected to change constantly at rates that depend upon the size and density of the sintered metal material which may change upon installation. In such plugs, the pressure drop across the resistor occurs over the entire plug when it is initially installed but as the upstream surface becomes clogged that surface comes to provide most or all of the effective resistance and the pressure drop provided by the resistor may be expected to occur across the surface of the upstream end. Due to the foregoing characteristics, the usefulness of the method of providing fluid resistance by means of the simple insertion of a sintered metal plug within a passageway is substantially limited except in applications where the functions of the resistor are simply to provide an uncalibrated bleeding of fluid. Such methods are not useful in application where clogging may be a problem or where is necessary to accurately control the resistance provided or provide a constant level of resistance to flow. Further, the retention of the sintered material by friction imposed by radial compression is limited by the need to refrain from altering the porosity of the material.

SUMMARY OF THE INVENTION

The method of the present invention and devices formed in accordance therewith provide a means for obtaining high fluid resistance at a relatively low cost, with a low rate of clogging and the ability to withstand high pressure differentials across the resistor. The method comprises forming an orifice of reduced internal diameter that is as small as is possible to achieve at a commercially reasonable cost and then partially blocking the orifice by covering it with a masking element formed of a suitably porous material. The surface of the masking element is partly solid and partly open and covers the high pressure side of the orifice, reducing the effective size of the orifice to a percentage of its original area corresponding to the percent of open area on the surface of the porous material abutting the orifice. The masking element is retained on the side of the orifice that is expected to be exposed to higher fluid pressure. In applications where one directional pressure differentials are expected, a single masking element may be used. In applications where the pressure differential may change directions, and either side may be the high pressure side, two elements, one on either side of the orifice, are used. One or more orifices are created at the smallest diameter that can be produced at a reasonable cost and the orifices may be arranged in series or in other configurations. The porous material masking element is secured immediately proximate to and covering the orifice. The means for securing the masking element in proximity to the orifice preferrably leaves as much as possible of the surface area of the porous material open and exposed to the pressure of the fluid distal from the orifice, without unduly compressing the material of the masking element. In the preferred method, a radial clearance is created around the body of the masking element except where the masking element is secured by press fitting one end of the masking element into a socket with an internal diameter that is slightly less than the internal diameter of the masking element. A transverse section forming the inner end of the socket includes a central opening that forms the orifice. The press fit of the porous material is performed without so large an interference as to unacceptably or unpredictably alter the porosity of the material by compressing the material. The exact interference will depend upon a number of factors including the porosity of the material as well as the composition of the material and the expected flow characteristics of the system in which it is to be installed. The body of the masking element extends well past the socket such that a much larger area of the masking element is exposed to the fluid in the passageway distal from the orifice than is exposed at the orifice. The porous material is retained on whichever side of the orifice is expected to be exposed to the higher pressure fluid. If both sides are potentially subject to higher pressure, the porous material is retained on both sides of the orifice. If one directional pressure differentials are expected, the masking element is on the upstream side of the orifice with a large area exposed to the higher pressure fluid on the upstream end and a smaller area exposed to the lower pressure fluid at the orifice end. The net force on the masking element will force it against the transverse section and only the minimal retentive force required to prevent accidental displacement of the masking element is necessary. If two masking elements are used, the upstream element on the high pressure side of the orifice will be retained by the force of the fluid, but the masking element on whichever side of the orifice is exposed to the lower fluid pressure will experience a repulsive force away from the orifice which must be counteracted by the retentive force of the press fit of the masking element in the socket. Due to the upstream resistance provided by the interface between the upstream masking element and the orifice, the pressure drop across the downstream interface between the orifice and the downstream masking element is expected to be only one half of the pressure drop across the whole resistor. The pressure of the fluid to which upstream end of the downstream masking element is exposed is expected to be greater than the pressure of the fluid to which the downstream end of the downstream masking element is exposed, thereby creating the potential of a net force on the downstream masking element away from the orifice. The resultant force is mitigated by the exposure of a larger area to the lower pressure while the area of the downstream masking element that is exposed to the higher pressure fluid through the orifice is small. For these reasons, the net repulsive force on the downstream masking element is modest or slight and the retentive force required to counteract the repulsive force is expected to be slight. Since the required retentive force is slight in either direction, the interference between the masking elements and the sockets can provide the requisite retentive force without being so extreme as to cause a substantial change in the density of the porous material of the masking element. The socket and orifice are either formed in a separate body that is securely installed within the flow passageway, or are formed in the passageway itself. If the socket and orifice are formed within a body separate from the system, the unit can be tested and rated before installation in the system. If on the other hand, the socket and orifice are formed by the inside of the passageway, the result of the slight compression of the porous material should be tested in place after installation for accurate measurement of resistance. Since it is frequently preferable to know the exact resistance level achieved before installation, the method of installing the porous material in a separate body with an internal orifice is expected to be preferable. The body may be cylindrical or otherwise shaped as may be advantageous in securing the body within the fluid passageway. Specifically, the preferred method includes tapering the exterior surface of the body from a large end on the higher pressure side of the orifice to the smaller end at the lower pressure side of the orifice, and installing the resistor in a passageway that has been reamed or cast or otherwise formed with a corresponding taper. The fit of a tapered resistor body within the passageway will sealingly secure the resistor body within the passageway even under conditions of dimensional inaccuracies due to the ability of the tapered body to seat itself within the tapered bore. The tapered resistor body will resist the force of high pressure in the direction of the smaller end until the pressure causes the material of the body to compress or collapse causing the resistor to fail. It is anticipated that, using common materials, the tapered resistor body would be able to withstand high enough pressures for the device to be useable in a wide range of applications, including most anticipated uses. The tapered resistor body, however, will not securely resist an equally high pressure in the opposite direction, toward the larger end, but the bi-directional resistor may utilize a tapered outer surface if the expected back pressure is not in excess of the anticipated retentive force. The optimum range of taper angles for tapering the resistor body is from about 1 to about 7 degrees and the best angle for most applications is expected to be about 4.3 drgrees. Outside of the acceptable range of taper angles, either retention or sealing ability is reduced to unacceptable levels. The orifice is formed in a transverse section of the restrictor body which provides a shoulder to axially support the masking element. The restrictor body may be formed of a wide variety of materials provided they have adequate strength for the intended application.

The porous material could be a variety of materials. In the preferred embodiment, the porous material is a sintered metal formed of an incompletely compressed metal powder that has been heated, under pressure, to sinter the metal grains and produce a porous material with the requisite structural integrity. Such sintered metal products are currently commercially available from a number of sources in a variety of shapes and sizes, formed in a variety of levels of porosity and from a variety of metals.

The open cross sectional area of the orifice is reduced by the masking effect of the porous material to a degree determined by the porosity of the surface of the material at the orifice. The masking element is shaped and is expected to be significantly larger in diameter than the orifice, and is retained to provide an abundance of surface area exposed to the fluid distal from the orifice, which surface area serves as a filtering element. The surface area of the orifice, and thus of that part of the masking element that is exposed to the lower pressure fluid by the orifice, is much less than the surface area exposed to the higher pressure fluid on the opposite side of the masking element from the orifice, that is, distal from the orifice. For this reason, the pressure drop across the resistor occurs at the interface of the orifice and the masking element or elements rather than across the entire resistor. The openings in the surface of the masking element that are exposed by the orifice are protected from clogging by the filtering function of almost all of the body of the masking element. Using the porous material to mask a small orifice allows use of material with larger pores than would be required by a conventional sintered metal restrictor, thereby decreasing the likelihood of clogging the pores. Increasing the surface area of porous material exposed to the higher pressure fluid will be expected to increase the useful life of the element as a filter.

The resistance provided by the present method is determined by the size of the orifice and the percent of the surface area of the sintered material that is open, although in extreme circumstances the size of the pores or the length of the resistor may have an effect. In addition, the use of sintered material as a mask covering an orifice allows axial support of the sintered material by the shoulder which forms the orifice without the necessity of relying upon frictional contact by the porous material with the walls of the flow passage for retention against the force of the system pressure. The shoulder supports the masking element against the force of high pressure differentials without compressing the porous material of the masking element. In addition, by comprising a shell section that is radially spaced from the masking element, the resistor body may be configured to forcefully engage the passageway wall without communicating the compressive force to the sintered material.

The principal aim of the present invention is to provide a new and improved method and device for providing fluid resistance which meets the foregoing requirements and which provides a high resistance at a low cost.

Another and further object and aim of the present invention is to provide a new and improved method and device for providing fluid resistance having the ability to withstand high pressure differentials.

Another and further object and aim of the present invention is to provide a new and improved method and device for providing fluid resistance which will be economical to implement.

Other objects and advantages of the invention will become apparent from the Description of the Preferred Embodiments and the Drawings and will be in part pointed out in more detail hereinafter.

The invention consists in the features of construction, combination of elements and arrangement of parts exemplified in the construction hereinafter described and the scope of the invention will be indicated in the appended claims.

DESCRIPTION OF THE PREFERRED EMBODIMENT(S)

Figure 1:
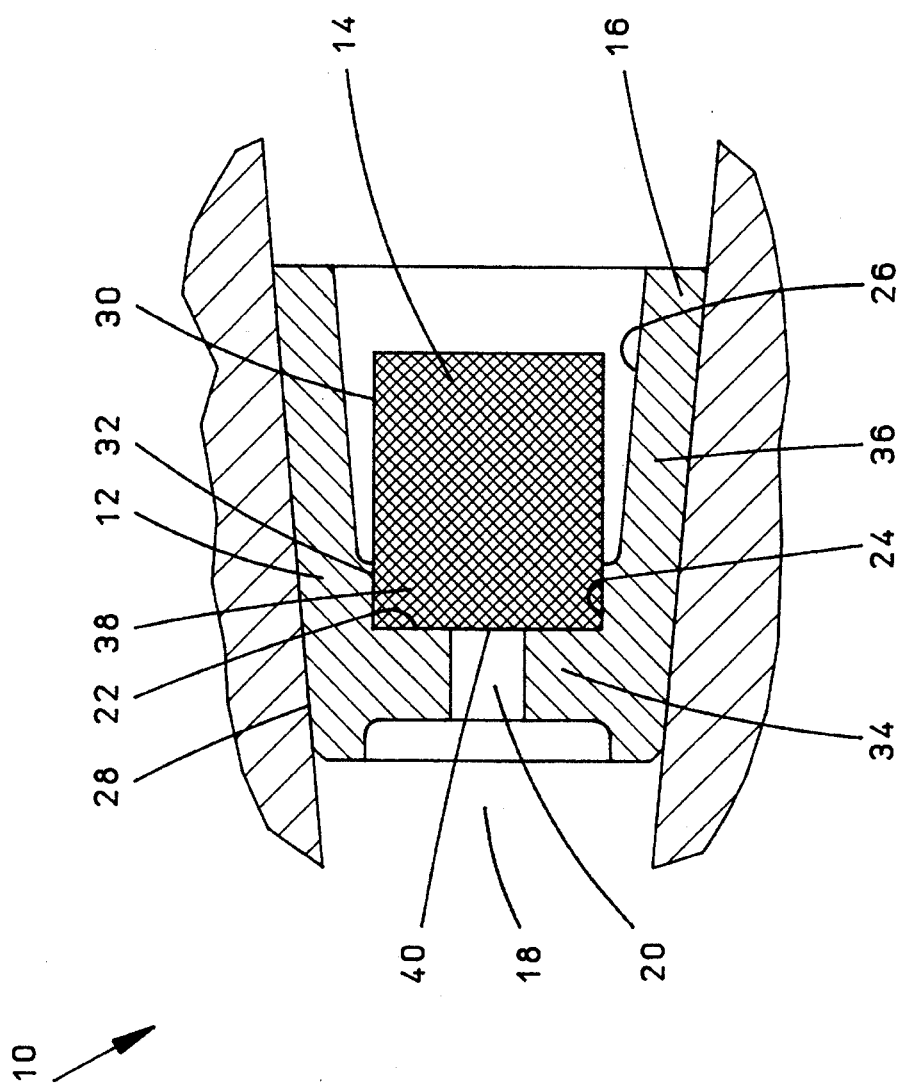
FIG. 1 is a cross section of a first preferred embodiment of fluid resistor in accordance with the method of the invention.
Figure 2:
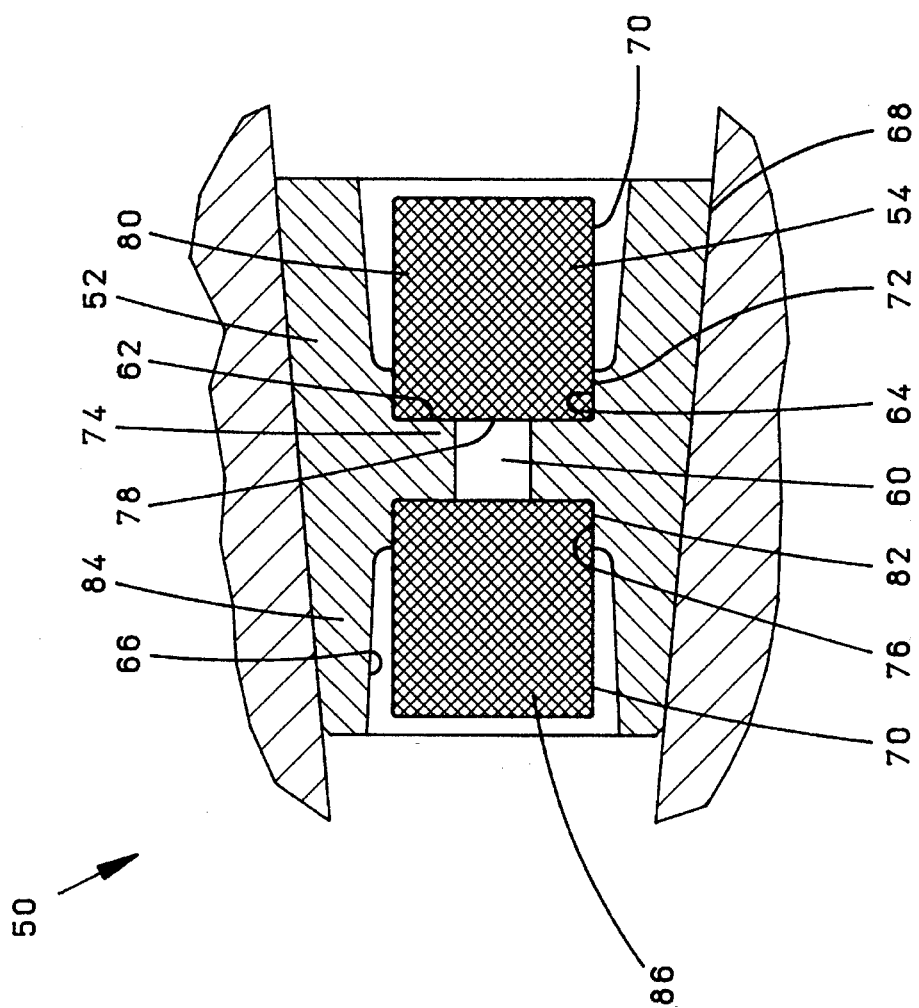
FIG. 2 is a cross section of a second preferred embodiment of a fluid resistor constructed in accordance with the method of the invention.

The method of the present invention is a method of achieving a high rate of fluid resistance within a flow passageway. The method of the present invention results in and is practiced by means of physical embodiments as depicted in the Drawings. With reference to the Drawings wherein like numerals represent like parts throughout the Figures, a first embodiment of a fluid resistor formed as a separate unit having a separate body, in accordance with the method of the present invention, is generally designated by numeral 10 in FIG. 1 and a second embodiment of a fluid resistor formed as a separate unit having a separate body, in accordance with the method of the present invention, is generally designated by numeral 50 in FIG. 2. The practice of the method of the present invention involves the use of a sintered metal plug as a mask to partially block an orifice of reduced diameter. In the simplest form the method does not require the use of a separate body as the orifice may be formed directly in the passageway and the sintered metal plug can be secured by the walls of the passageway. In this manner, the functions performed by the separate body in FIGS. 1 and 2 are accomplished by adaptation of the interior of the flow passageway in which the resistance is desired. Two embodiments of the method of the present invention practiced without the use of a separate body are designated by numerals 100 and 150 in FIGS. 3 and 4 respectively. The embodiment shown in FIG. 3 corresponds to the embodiment shown in FIG. 1 and the embodiment shown in FIG. 4 corresponds to the embodiment shown in FIG. 2.

Fluid resistor 10 is comprised of a body 12 and a masking element 14. Resistor 10 is an embodiment of the method as adapted particularly for applications in which the pressure differentials experienced are ordinarily in the same direction and as such comprises a high pressure end 16 and a low pressure end 18. Resistor 10 is installed such that high pressure end 16 is exposed to fluid pressure that is greater than the pressure of the fluid to which the low pressure end 18 is exposed. The method comprises the formation of as small an orifice as is possible at a commercially reasonable cost and in resistor 10, an orifice 20 is formed in resistor body 12. Orifice 20 is as small as is desired and as is possible within the limit of commercially reasonable cost; the smallest orifice currently being achieved at a reasonable cost is approximately 0.005 inches in diameter. The method further comprises the masking, or partial blocking of the orifice by means of a masking element. In the illustrated preferred embodiment of resistor 10, masking element 14 is formed as a cylindrical solid made of a suitably porous material with a radially outer surface 30 and an orifice masking end 38. In the preferred embodiment of resistor 10, masking element 14 is formed of a sintered metal material; however, it is anticipated that other suitably porous materials may be used, such as ceramic materials. In accordance with the method of the present invention, the masking element 14 is placed on the side of orifice 20 that is expected to be exposed to higher fluid pressures, that is, toward high pressure end 16. The resistor body 12 is symmetrical about a longitudinal axis. At low pressure end 18 body 12 forms a transverse section 34, being a flat disk lying in a plane normal to the axis of body 12 with orifice 20 formed through the center of section 34. An important element of the method is the retention of the masking element 14 in proximity to orifice 20 by means that leave a larger surface area exposed to the higher pressure fluid than is exposed to the lower pressure fluid. Following the method of the present invention, the masking element 14 is secured immediately adjacent to the orifice 20, and as a result, the area of the masking element 14 that is exposed to the lower pressure fluid on the low pressure side of orifice 20 is the same as the inside area of orifice 20. To carry out the method, exposing a large surface area of the masking element 14 to the high pressure fluid, at high pressure end 16, a hollow, generally cylindrical shell section 36 is formed in body 12 with an inner wall 26 of sufficiently large internal diameter to be radially spaced from the outer surface 30 of masking element 14. Intermediate between shell section 36 and transverse section 34, resistor body 12 comprises a socket 32 with an inner wall 24 sized to receive the orifice masking end 38 of masking element 14. The diameter of masking element outer surface 30 at orifice masking end 38 is slightly greater than the internal diameter of socket inner surface 24 causing a slight interference. On assembly, orifice masking end 38 of masking element 14 is lightly pressed into socket 32 and is frictionally retained therein by the interference with surface 24. The transverse section 34 forms a shoulder at the transition from socket inner surface 24 to transverse disk section 34 presenting the flat, disk shaped surface 22 facing in the direction of high pressure end 16. On assembly, masking element 14 is inserted into socket 32 until orifice masking end 38 engages surface 22. Orifice masking end 38 comprises a flat, transverse, disk shaped end surface 40, which is parallel to and in contact with shoulder surface 22 after assembly. The portion of orifice masking end 38 of masking element 14 that is exposed to the fluid media on the low pressure end 18 of resistor 10 is limited to and equal to the cross sectional area of orifice 20.

It is necessary to sealingly secure the body 12 of the resistor 10 formed in accord with the method within the flow passageway to resist displacement by the force imposed by the pressure of the fluid media and to seal the passageway forcing flow through orifice 20. One method of securing Resistor 10 is by means of tapering the exterior surface 28 of the body 12 from a large end on the higher pressure end 16 to a smaller end at the lower pressure end 18 and reaming, casting or otherwise forming a corresponding taper in the installation passageway. The tapered outer surface 28 of resistor body 12 will resist the force of high pressure in the direction of the smaller, low pressure end 18. The optimum range of taper angles is from about 1 to about 7 degrees, with the optimum angle about 4.3 degrees. Positive deviations from the optimum taper angle, with larger angles, tend to reduce the retentive friction and increase the ease of installation. Conversely, negative deviations from the optimum taper angle, with smaller angles, tend to increase the retentive friction and decrease the ease of installation. It is to be anticipated that outer surface 28 may assume a variety of alternative shapes specifically designed to increase axial friction between surface 28 and the inner wall of flow passage which resistor 10 may be installed. Such variations may include annular ridges or teeth. It is desirable to avoid causing increased compression in the area of socket 32 to avoid any more compression of masking element 14 than is necessary. For this reason, modifications to outer surface 28 using radial forces imposed in the area of shell section 36 are to be preferred and radial compression on the area of socket 32 is to be avoided.

Consistent with the general method step of masking the higher pressure side of the orifice, in applications in which the direction of the pressure differential may switch, both sides of the orifice are masked. An illustration of the application of the method of the present invention in situations in which the direction of the pressure differential across the resistor may vary is illustrated in FIG. 2 showing a resistor 50 constructed for use with bi-directional pressure differentials. Fluid resistor 50 is designed as a bi-directional adaptation of fluid resistor 10 by the addition of a second masking element 86 that is secured on the opposite side of an orifice 60 from a first masking element 54. Fluid resistor 50 comprises a body 52 that is symmetrical about a central longitudinal axis and additionally is internally symmetrical across a plane that is normal to the axis and passes through the orifice 60. Since resistor 50 is formed in accordance with the same method that results in resistor 10, one side of resistor 50 comprises first masking element 54 which has an orifice mask end 78, a high pressure end 80, and an outer surface 70, which fits into a socket 72 formed by a transverse section 74 such that end 78 is secured against shoulder surface 62 by frictional engagement with the inner surface 64 of socket 72, all of which features are similar to the corresponding features of resistor 10. Further, to expose a large area of the surface 70 of masking element 54, resistor body 52 comprises a shell section 76 with an inner wall 66 that provided a radial clearance around masking element outer surface 70, as in resistor 10. To accommodate the change of direction of the pressure differential, resistor body 52 forms a second socket 82 and shell section 84 that receive a second masking element 86 such that the interior of resistor 50 is identical on both sides of orifice 60. The outer surface 68 of resistor body 52 is tapered to be securely and sealingly fixed within a similarly tapered flow passageway. The tapered resistor body 52, however, will not securely resist an equal pressure in the opposite direction, toward the larger end and may be utilized only if the expected back pressure is not in excess of the anticipated retentive force. It is to be anticipated that other methods of securing resistor 50 within the flow passageway may be used. As with Resistor 10, adaptations of the outer surface 68 of the resistor body 52 that minimize the imposition of compressive force on the area radial to sockets 72 and 82 are to be preferred.

Figure 3:
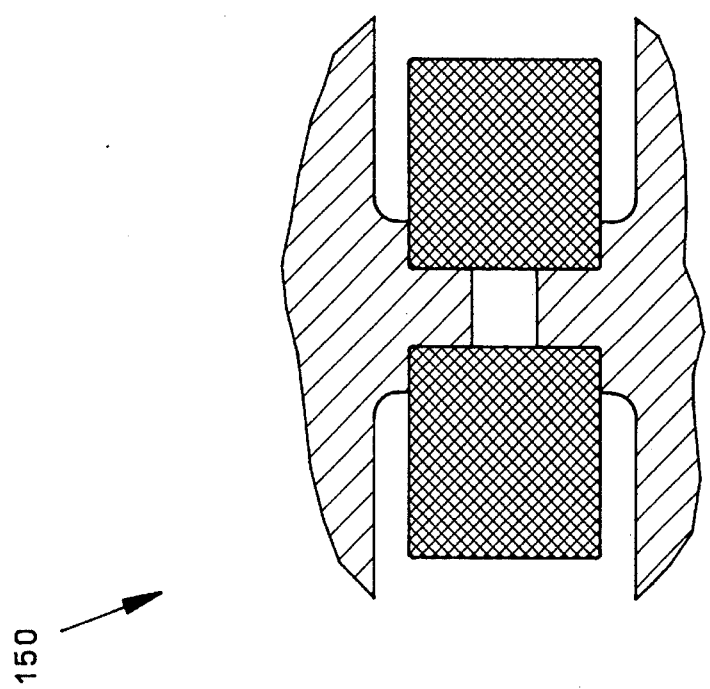
FIG. 3 is a cross section of a first preferred embodiment of a fluid resistor constructed in accordance with the method of the invention without a separate body.

While resistors 10 and 50 comprise a separate resistor body, the method of the present invention may be carried out without the use of a separate resistor body if the orifice is formed directly within the passageway and the high pressure side or sides are masked by a masking element or elements which are retained directly adjacent to the orifice. The general method of providing resistance is the same as embodied by resistors 10 and 50 in that the orifice is partially obstructed by a porous masking element retained on the side of the orifice exposed to higher pressure, and immediately adjacent to the orifice. Further, the surface area of the masking element that is exposed to higher pressure is greater than the area exposed to lower pressure, that is, the area of the orifice. A resistor 100 is shown in FIG. 3 demonstrating the practice of the present method in an application wherein the direction of the pressure differential remains constant. In this variation of the method, a cylindrical masking element 102 is formed of sintered metal powder and has an outer surface 104, with an outside diameter that is generally less than the inside diameter of the passageway so that a radial clearance exists generally around the masking element 102, between the masking element outer 104 surface and the inner wall 116 of the flow passageway. An orifice 106 is formed in the center of a transverse disk section 134 which otherwise seals the flow passageway. Orifice 106 is made as small as small as desirable and possible at a commercially reasonable cost. Masking element 102 comprises a flat orifice end 108 which is retained in direct proximity to transverse section 134. To retain masking element 102, a socket 110 is formed by a reduced diameter section of inner wall of the passageway immediately proximate to orifice 106 and the transverse disk section 134. Socket 110 has an inner surface 114 sized to receive the orifice end 108 of masking element 102 with a slight interference caused by the diameter of masking element surface 104 at orifice end 108 being slightly greater than the internal diameter of socket inner surface 114. On assembly, orifice end 108 of masking element 102 is lightly pressed into socket 110 and is frictionally retained therein by surface 114. The transition from socket surface 114 to transverse disk section 134 forms an internal shoulder comprising of a flat disk shaped surface 112 facing in the direction of higher fluid pressure toward the masking element 102. On assembly, masking element 102 is inserted into socket 110 until orifice end 108 engages shoulder surface 112. Orifice end 108 comprises a flat transverse, disk shaped end surface 130, which, after assembly, is parallel to and in contact with shoulder surface 112. To expose a large area of the surface 104 of masking element 102, less than the entire length of masking element 102 is received within socket 110 and the diameter of masking element 102 is less than the inside diameter of the passageway in general such that there exists a radial clearance around so much of the masking element surface 104 as is not received in socket 110. The radial clearance around masking element surface 104 exposes the adjacent section of the masking element surface 104 to the higher pressure fluid. The portion of orifice end 108 of masking element 102 that is exposed to the fluid media on the low pressure side of resistor 100 is limited to and equal to the cross sectional area of orifice 106. The cross sectional area of orifice 106 is much less than the area of the masking element surface 104 that is exposed to the higher pressure fluid, thus implementing the method step of exposing more of the surface area of the masking element to the higher pressure fluid than is exposed by the orifice to the lower pressure fluid.

Figure 4:
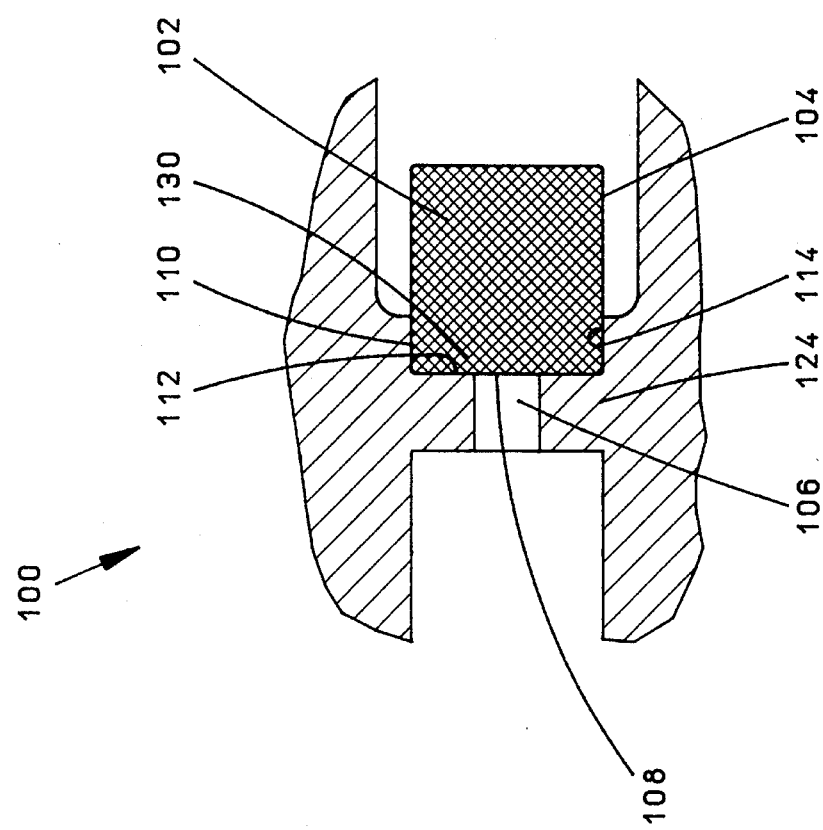
FIG. 4 is a cross section of a second preferred embodiment of a fluid resistor constructed in accordance with the method of the invention without a separate body.

The result of employing the method of the present invention to provide bidirectional fluid resistance without a separate body, in accordance with the present invention is shown in FIG. 4 depicting bidirectional resistor 150. Resistor 150 is comprised of two masking elements 152 and 154, both formed of sintered metal powder. A transverse disk section 162 is formed within the passageway and an orifice 156 is formed in the center of transverse disk section 162 which otherwise seals the flow passageway. To mask the higher pressure side of the orifice 156, each masking element 152 and 154 is secured on either side of the orifice 156. Orifice 156 is made as small as desirable and possible at a commercially reasonable cost. Two sockets 164 and 166 are formed by reduced diameter sections 168 and 170 of the inner wall of the passageway on both sides of and immediately proximate to orifice 156 and the transverse disk section 162. Sockets 164 and 166 both have inner wall surfaces 168 and 170 which are sized to receive the masking elements 152 and 154 with a slight interference caused by the diameter of masking element surfaces 158 and 160 being slightly greater than the internal diameter of socket inner surfaces 168 and 170. On assembly, each one of masking elements 152 and 154 is lightly pressed into one of sockets 164 and 166 and is frictionally retained therein by its respective outer surface 158 or 168. The surfaces of transverse disk section 162 form a pair of internal shoulders 174 and 176 and on assembly, masking elements 152 and 154 are inserted into sockets 164 and 166 until the masking elements 152 and 154 engage the surfaces of shoulders 174 and 176. Both masking element outer surfaces 158 and 160 have outside diameters that are less than the inside diameter of the passageway except the sockets 164 and 166 and orifice 156. To expose a large area of the surface of the upstream mask element to the higher pressure fluid within the passageway, less than all of the length of both masking elements 152 and 154 is inserted into the sockets 164 and 166 so that a radial clearance exists around a portion of the masking elements 152 and 154, between the masking element outer surfaces 158 and 160 and the inner wall of the flow passageway. Resistor 150 is formed in the same general manner as resistor 100, on one side, and includes in addition, essentially the mirror image of resistor 100. Accordingly, resistor 150 is bilaterally symmetrical across a plane through orifice 156, normal to the axis of the passageway, and resistor 150 is symmetrical about the axis of the passageway, as well. Since the transverse section 162 must be sufficiently strong to add support to the masking elements to prevent displacement due to the force of the fluid, transverse section 162 has an appreciable thickness. Due to the thickness of transverse section 162, The masking elements 152 and 154 interface orifice 156 at two points, at which points the flow is most restricted. At any one time, only whichever one of the masking elements 152 or 154 that is on the side of orifice 156 being exposed to higher pressure, will perform a filtering function, while whichever one of the masking elements 152 or 154 that is on the side of orifice 156 being exposed to lower pressure will contribute to the total resistance provided by resistor 150.

It is to be anticipated that multiple resistors connected in series fashion would achieve greater flow resistance overall without decreasing the minimum bore size. Parallel arrays of flow passages in accord with the described invention are possible and suggested to provide increased flow capacity.

The surface of the porous material of the masking element is described as being a certain percentage open. Generally, the resistance provided by the present method depends upon the size of the orifice that remains open. The remaining open area may be found by applying the percent of the masking element surface that is open to the original area of the orifice.

It should be appreciated and anticipated that the bodies 12 and 52 of resistors 10 and 50 may be fabricated of variety of materials with satisfactory, but somewhat different results. It is specifically anticipated that stainless steel, plastic or composite materials may be used and the differing characteristics of such materials would be design considerations. In applications involving softer or more plastic materials, the taper angle of the resistor body would be considerably more important that with harder materials that would not have the same potential to deform under pressure. Generally, the resistor body should be thermally compatible with the material of the installation bore and the masking element to prevent the stresses or separations frequently caused by unequal expansion and contraction rates. Lengthening or convoluting a portion of the surface of the masking elements is expected to increase the surface area exposed to fluid within the flow passageway and thereby increase the useful life of the resistor without altering its performance.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A method of achieving fluid resistance within a flow passageway comprising:
   (a) sealing the passageway with a transverse member
   (b) forming an orifice in the transverse member, and
   (c) reducing the area open to flow to less than the area of the orifice by masking the orifice with at least one masking element formed of a porous material, retained in direct contact with the orifice and having an outside dimension that is less than the inside dimension of the flow passageway surrounding a part of each masking element, creating a radial clearance around a portion of each masking element.

2. The method of claim 1 wherein each masking element is formed of a sintered metal material and has an outside dimension that is greater than the inside dimension of the orifice and less than the inside dimension of the flow passageway.

3. The method of claim 2 wherein each masking element has a cylindrical shape with a flat end surface adjacent to the orifice.

4. The method of claim 3 wherein the step of retaining each masking element in contact with the orifice comprises forming a cylindrical socket for each masking element, each socket having an inside diameter that is slightly less than the outside diameter of the masking element to be inserted therein, and inserting less than all of each masking element into the retaining socket.

5. The method of claim 4 further comprising the step of retaining a masking element in contact with each side of the orifice.

6. The method of claim 5 further comprising the steps of forming the transverse member and sockets in a separate body and sealingly securing the body within the flow passageway.

7. The method of claim 6 wherein the step of securing the body within the flow passageway comprises tapering the outer surface of the body and forming a corresponding taper in the inner wall of the flow passageway.

8. The method of claim 7 wherein the angle of taper of the outer surface of the body and of the inner wall of the flow passageway is between 1 and 7 degrees.

9. The method of claim 8 wherein the angle of taper of the outer surface of the body and of the inner wall of the flow passageway is about 4.3 degrees.

10. A method of achieving fluid resistance within a flow passageway comprising:

(a) forming an orifice of reduced internal diameter within a resistor body, (b) sealingly securing the resistor body within the flow passageway, and (c) reducing the area open to flow to less than the area of the orifice by masking the orifice with at least one masking element formed of a porous material, retained in direct contact with the orifice, and having an outside dimension that is less than the inside dimension of the flow passageway surrounding a part of the masking element, creating a radial clearance around a portion of the masking element.

11. The method of claim 10 wherein the step of securing the body within the flow passageway comprises tapering the outer surface of the body and forming a corresponding taper in the inner wall of the flow passageway.

12. The method of claim 11 wherein the angle of taper of the outer surface of the body and of the inner wall of the flow passageway is between 1 and 7 degrees.

13. The method of claim 12 wherein each masking element has a cylindrical shape with a flat end surface adjacent to the orifice.

14. The method of claim 13 wherein the step of retaining each masking element in contact with the orifice comprises forming a cylindrical socket for each masking element, each socket having an inside diameter that is slightly less than the outside diameter of the masking to be inserted therein, and inserting less than all of the masking element into the socket.

15. The method of claim 14 wherein each masking element is formed of sintered metal.

16. The method of claim 15 further comprising the step of retaining masking elements in contact with both sides of the orifice.

17. The method of claim 16 wherein the angle of taper of the outer surface of the body and of the inner wall of the flow passageway is about 4.3 degrees.

18. A device for achieving fluid resistance within a flow passageway comprising a body, an orifice of reduced internal diameter formed within the resistor body, and means for reducing the area open to flow to less than the area of the orifice comprising at least one masking element formed of a porous material and having a substantially flat surface, at least one masking element being retained with the flat surface in direct contact with the orifice and substantially normal to the axis of the orifice, with a radial clearance existing around at least a portion of the masking element.

19. The device of claim 18 wherein the means for retaining each masking element comprises a socket formed within the resistor body immediately proximate to the orifice, having internal dimensions sufficient to cause a frictional interference fit of the masking element within the socket, and less than all of each masking element is received within the socket such that a radial clearance exists between the portion of each masking element that is not within the socket and the resistor body.

20. The device of claim 17 wherein the resistor body is shaped to provide the secure retention of the resistor body within the flow passageway.

21. The device of claim 20 wherein the resistor body further comprised a tapered outer surface, having a first end and a second end that is of greater outside diameter than the first end.

22. The device of claim 21 wherein the angle of taper of the outer surface of the body and of the inner wall of the flow passageway is between 1 and 7 degrees.

23. The device of claim 22 wherein the angle of taper of the outer surface of the body and of the inner wall of the flow passageway is about 4.3 degrees.

24. The device of claim 22 wherein one masking element is retained on the side of the orifice closer to the second end of the outer surface of the body.

25. The device of claim 23 further comprising masking elements retained in direct contact with both sides of the orifice.

26. The device of claim 22 wherein each masking element is formed of sintered metal.

27. The device of claim 26 wherein one masking element is retained on the side of the orifice closer to the second end of the outer surface of the body.

28. The device of claim 27 further comprising masking elements retained in direct contact with both sides of the orifice.

* * * * *